United States Patent
Brunel et al.

(10) Patent No.: US 8,111,665 B2
(45) Date of Patent: Feb. 7, 2012

(54) METHODS AND DEVICES FOR DETERMINING IF A HANDOVER HAS TO BE EXECUTED FOR A TERMINAL

(75) Inventors: Loic Brunel, Rennes Cedex (FR); Alain Mourad, Rennes Cedex (FR); David Mottier, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 426 days.

(21) Appl. No.: 12/364,760

(22) Filed: Feb. 3, 2009

(65) Prior Publication Data
US 2009/0207813 A1 Aug. 20, 2009

(30) Foreign Application Priority Data
Feb. 15, 2008 (EP) .................. 08002824

(51) Int. Cl.
*H04W 4/00* (2009.01)
(52) U.S. Cl. ........................................ 370/331
(58) Field of Classification Search ........... 370/310–350
See application file for complete search history.

(56) References Cited

U.S. PATENT DOCUMENTS

| | | | | |
|---|---|---|---|---|
| 5,917,811 A * | 6/1999 | Weaver et al. | | 370/332 |
| 6,388,997 B1 * | 5/2002 | Scott | | 370/280 |
| 7,260,399 B1 * | 8/2007 | Oh et al. | | 455/436 |
| 7,668,199 B2 * | 2/2010 | Troulis et al. | | 370/467 |
| 2004/0128095 A1 | 7/2004 | Oestreich | | |
| 2005/0064879 A1 * | 3/2005 | McAvoy | | 455/456.1 |
| 2005/0239410 A1 * | 10/2005 | Rochester, III | | 455/67.11 |
| 2005/0276242 A1 * | 12/2005 | Goto et al. | | 370/328 |
| 2007/0004430 A1 * | 1/2007 | Hyun et al. | | 455/456.1 |
| 2007/0019667 A1 * | 1/2007 | Mottier et al. | | 370/458 |
| 2009/0088176 A1 * | 4/2009 | Teo et al. | | 455/452.1 |
| 2009/0161599 A1 * | 6/2009 | Haartsen et al. | | 370/326 |
| 2009/0274086 A1 * | 11/2009 | Petrovic et al. | | 370/312 |
| 2010/0103899 A1 * | 4/2010 | Kwak et al. | | 370/329 |
| 2010/0150044 A1 * | 6/2010 | Kim et al. | | 370/311 |

FOREIGN PATENT DOCUMENTS

| | | |
|---|---|---|
| EP | 1 746 743 A1 | 1/2007 |
| GB | 2 418 806 A | 4/2006 |
| WO | WO 2007/104718 A1 | 9/2007 |

OTHER PUBLICATIONS

U.S. Appl. No. 12/364,789, filed Feb. 3, 2009, Brunel, et al.

* cited by examiner

*Primary Examiner* — Kwang B Yao
*Assistant Examiner* — Kenan Cehic
(74) *Attorney, Agent, or Firm* — Oblon, Spivak, McClelland, Maier & Neustadt, L.L.P.

(57) ABSTRACT

A method for determining if a handover of a half-duplex terminal has to be executed from a first base station to a second base station, the half-duplex terminal not transferring and not receiving signals during a period of time, called an idle period. The first base station transfers to the half-duplex terminal a downlink signal in the cell of the first base station. The first base station receives a message in response to the downlink signal including information relative to quality measurements on the downlink signal transferred by the first and the second base stations. The first base station determines the round trip delay between the half-duplex terminal and the second base station. The first base station further transmits a handover notification message to the half-duplex terminal instructing the half-duplex terminal to execute a handover procedure from the first base station to the second base station.

17 Claims, 5 Drawing Sheets

METHODS AND DEVICES FOR DETERMINING IF A HANDOVER HAS TO BE EXECUTED FOR A TERMINAL

The present invention relates generally to methods and devices for determining, in a wireless cellular telecommunication network, if a handover has to be executed for a terminal.

In state of the art of wireless cellular telecommunication networks, each terminal is regularly assigned a candidate set of base stations, which could in theory handle the communication. These candidate base stations may be for instance base stations surrounding the base station which is currently handling the terminal. Each terminal regularly measures, or measures on demand, i.e. after a particular event, the quality of the signals in the measurement channels of the different candidate base stations. These measurements are then reported by the terminal to the base station which is currently handling the terminal which may decide whether to start a handover procedure.

Alternatively, a candidate set of base stations is not assigned to the terminals. Each terminal performs measurements with the base stations from which it receives signals of the measurement channel with enough quality. Then, the terminal reports the measurements to the base station which is currently handling the terminal which may decide whether to start a handover procedure or to validate a handover procedure requested by the terminal.

Such a state-of-the-art handover is valid for full-duplex terminals but may lead to some issues for half duplex terminals.

A full-duplex terminal is a terminal which is able to transmit and receive radio signals simultaneously.

A half-duplex terminal is a terminal which is not able to transmit and receive radio signals simultaneously. For instance, the terminal operates in Time Division Duplex (TDD) mode, with transmission and reception on the same frequency band but at different time periods. The terminal may also operate in Frequency Division Duplex (FDD) mode, with transmission and reception on different frequency bands and at different time periods.

When a base station transmits symbols at time te to a half-duplex terminal, these symbols are received by the terminal located at a distance d from the base station at a time equal to te+RTD(d)/2, where RTD(d) is the Round Trip Delay for the terminal. These symbols are processed by the terminal which then may transmit also symbols over the uplink channel to the base station. Before transmitting symbols over the uplink channel, the terminal TE has to wait for a period of time, said Receive Transmit Switch time or simply switching time and referred to as RTS, in order to take into account the duration of hardware and software operations. For instance, this delay RTS is the maximum of the time needed by hardware equipments of the terminals to switch between reception and transmission modes and the time needed by hardware equipments of the base station to switch between transmission and reception modes. Thus, the symbols transmitted over the uplink channel cannot be received at the base station BTS before a time tr equal to te+RTD(d)+RTS+$D_{DL}$, $D_{DL}$ being the total duration of the symbols the terminal can receive in the downlink channel.

As example, if we consider a base station having a FDD cell radius of 10 km which is compatible with the Third Generation Partnership Project Long Term evolution (3GPP/LTE), an idle period duration which corresponds to two symbols duration needs to be created, either at both the base station and the terminal sides or only at the terminal sides in order to make the base station able to handle terminals located at any position in the cell. An idle period duration which corresponds to two symbols duration allows half-duplex terminals located at a distance from the base station up to 19.6 km to be handled by the base station.

An idle period duration which corresponds to one symbol duration allows only half-duplex terminals located at a distance from the base station up to 8.3 km to be handled by the base station. With such idle period duration, even if the quality of the signals of the measurement channel is sufficiently high, a half duplex terminal located at a distance larger than 8.3 km from the base station can not be handled by the base station whereas a full-duplex terminal could.

Thus, during communication, a handover procedure may be requested towards a base station whereas the half-duplex terminal can not be handled by the base station as the round trip delay between the base station and the terminal is not compatible with the idle period of the base station.

It has to be noted here that an idle period may be a continuous or a discontinuous time period as it will be disclosed hereinafter.

The present invention aims at enabling a base station of a wireless cellular telecommunication network to determine efficiently if a handover needs to be conducted for a half-duplex terminal.

To that end, the present invention concerns a method for determining, in a wireless cellular telecommunication network, if a handover of a half-duplex terminal has to be executed from a first base station to a second base station, each base station transferring signals in a respective cell, the half-duplex terminal, when being handled by one of the base stations, not transferring and not receiving signals during a period of time, called idle period of the cell of the base station which handles the terminal, characterized in that the method comprises the steps, executed by the first base station, of:

transferring signal in the cell of the first base station, receiving a message transferred by the half-duplex terminal in response to the signal transferred by the first base station, the message comprising information relative to quality measurements on the signal transferred by the first base station and at least quality measurements on the signal transferred by the second base station, obtaining information enabling the determination of the round trip delay between the half-duplex terminal and the second base station, determining the round trip delay between the half-duplex terminal and the second base station, determining if a handover of the half-duplex terminal has to be executed from the first base station to the second base station according to the determined round trip delay and the information relative to quality measurements.

The present invention concerns also a device for determining, in a wireless cellular telecommunication network, if a handover of a half-duplex terminal has to be executed from a first base station to a second base station, each base station transferring signals in a respective cell, the half-duplex terminal, when being handled by one of the base stations, not transferring and not receiving signals during a period of time, called idle period of the cell of the base station which handles the terminal, characterized in that the device for determining if a handover of the half-duplex terminal has to be executed is included in the first base station and comprises means for transferring signal in the cell of the first base station, means for receiving a message transferred by the half-duplex terminal in response to a signal transferred by the first base station, the message comprising information relative to quality measurements on the signal transferred by the first base station and at least quality measurements on the signal transferred by the second base station and information enabling the determination of the round trip delay between the half-duplex terminal and the second base station, means for determining the round trip delay between the half-duplex terminal and the second base station, means for determining if a handover of the half-duplex terminal has to be executed from the first base station to the second base station according to the determined round trip delay and the information relative to quality measurements.

Thus, the present invention avoids a loss of quality for the processing of half-duplex terminals in the network by avoiding ineffective handover procedure.

According to a particular feature, the information enabling the determination of the round trip delay between the half-duplex terminal and the second base station is the location of the half-duplex terminal and the location of the second base station.

Thus, there is no need to calculate the round trip delay at the terminal side.

According to a particular feature, the location of the half-duplex terminal is comprised in the received message.

Thus, the tasks executed by the base station are simplified.

According to a particular feature, the location of the second base station is comprised in a message transferred by the second base station to the first base station or comprised in the received message.

According to still another aspect, the present invention concerns a method for enabling the determination, in a wireless cellular telecommunication network, if a handover of a half-duplex terminal has to be executed from a first base station to a second base station, each base station transferring signals in a respective cell, the half-duplex terminal, when being handled by one of the base stations, not transferring and not receiving signals during a period of time, called idle period of the cell of the base station which handles the terminal, characterized in that the method comprises the steps, executed by the half-duplex terminal, of:

receiving signals from the first base station and the second base station, transferring a message to the first base station, the message comprising information relative to quality measurements on the signal transferred by the first base station and at least quality measurements on the signal transferred by the second base station and information enabling the determination of the round trip delay between the half-duplex terminal and the second base station.

According to still another aspect, the present invention concerns a device for enabling the determination, in a wireless cellular telecommunication network, if a handover of a half-duplex terminal has to be executed from a first base station to a second base station, each base station transferring signals in a respective cell, the half-duplex terminal, when being handled by one of the base stations, not transferring and not receiving signals during a period of time, called idle period of the cell of the base station which handles the terminal, characterized in that the device is included in the half-duplex terminal and comprises:

means for receiving signals from the first base station and the second base station, means for transferring a message to the first base station the message comprising information relative to quality measurements on the signal transferred by the first base station and at least quality measurements on the signal transferred by the second base station and information enabling the determination of the round trip delay between the half-duplex terminal and the second base station.

According to a particular feature, the wireless telecommunication network uses half duplex Frequency Division Duplexing scheme and only half-duplex terminals handled by the first or second base station do not transfer and do not receive signals during the idle period of the cell of the first or second base station or the half-duplex terminals handled by the first or second base station and the first or second base station do not transfer and do not receive signals during the idle period of the cell of the first or second base station.

Thus, the specific implementation costs at the base stations due to half-duplex FDD terminals are reduced or the power consumption of the base station is limited.

According to a particular feature, the wireless telecommunication network uses Time Division Duplexing scheme and the half-duplex terminals handled by the first or second base station and the first or second base station do not transfer and do not receive signals during the idle period.

Thus, the interference between uplink and downlink communication is reduced.

According to a particular feature, the half-duplex terminal receives from the second base station, the location of the second base station and the location of the second base station is comprised in the message transferred to the first base station.

According to still another aspect, the present invention concerns a signal transferred by a half-duplex terminal of a wireless cellular telecommunication network to a base station, the signal comprising information relative to quality measurements on the signal transferred by the base station and at least quality measurements on the signal transferred by another base station, characterized in that the signal further comprises information enabling the determination of the round trip delay between the half-duplex terminal and the other base station.

Thus, the process executed by the base station is simplified.

According to a particular feature, the information enabling the determination of the round trip delay between the half-duplex terminal and the other base station is the location of the half-duplex terminal.

Thus, there is no need to calculate the round trip delay at the terminal side.

According to a particular feature, the information enabling the determination of the round trip delay between the half-duplex terminal and the second base station is also the location of the second base station.

According to a particular feature, the cells of the wireless cellular telecommunication network are synchronised and the information enabling the determination of the round trip delay between the half-duplex terminal and the second base station is the difference of the time of reception of the signal transferred by the first base station and the signal transferred by the second base station.

Thus, the validation of the handover is further simplified.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and devices according to the invention, they will not be repeated here.

The characteristics of the invention will emerge more clearly from a reading of the following description of an example embodiment, the said description being produced with reference to the accompanying drawings, among which:

The wireless cellular telecommunication network may use Time Division Duplexing scheme (TDD) or half duplex Frequency Division Duplexing scheme.

In TDD scheme, the signals transferred in uplink and downlink channels are duplexed in different sub frames, named also time slots, in the same frequency band.

In full duplex Frequency Division Duplexing scheme, the signals transferred in uplink and downlink channels are duplexed in same sub frames, named also time slots, in different frequency bands.

In half duplex FDD scheme, from the half-duplex terminal side, the signals transferred in uplink and downlink channels are duplexed in different sub frames, named also time slots, in different frequency bands. It should be noted that in such case, a base station may be able to use a full duplex Frequency Division Duplexing scheme whilst communicating with several half-duplex FDD terminals at the same time by appropriately ordering the time slots of each half-duplex FDD terminal.

When a base station BS transfers symbols to a terminal TE, the data, the signals or the messages are transferred through a downlink channel.

When a terminal TE transfers symbols to the base station BS, the signals, the messages or data are transferred through an uplink channel.

Figure 1:
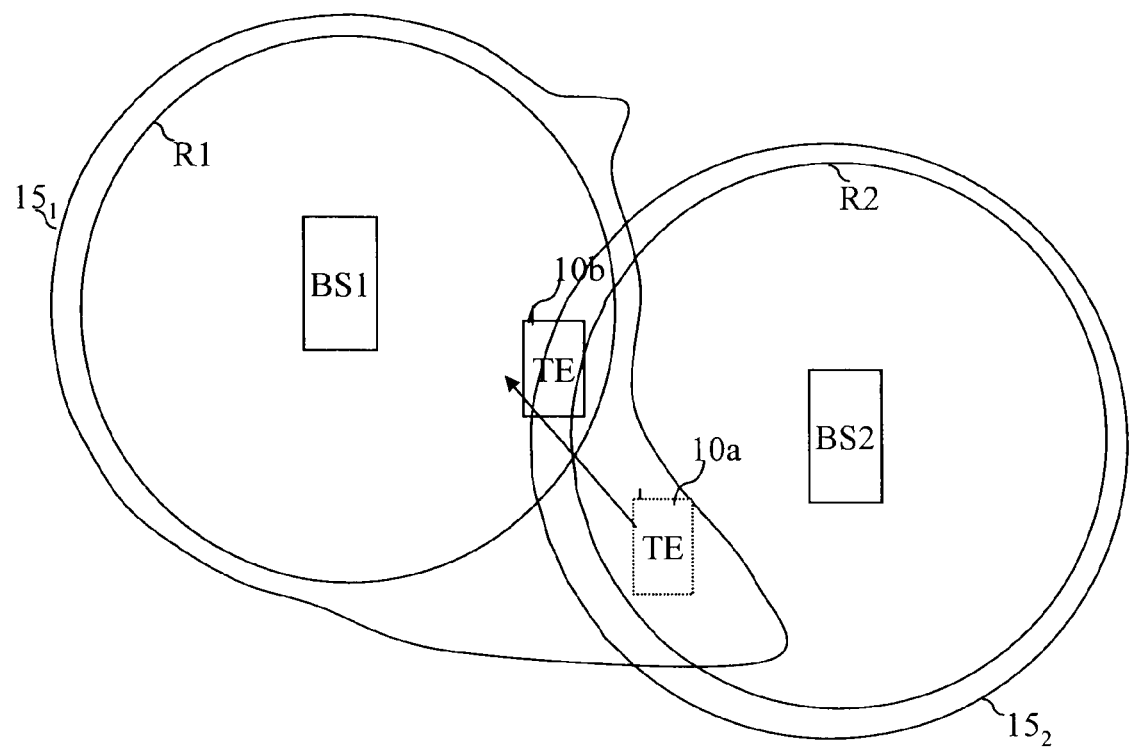
FIG. 1 is a diagram representing the architecture of the wireless cellular telecommunication network in which the present invention is implemented.

In the wireless cellular telecommunication network of the FIG. 1, a terminal TE located in the cell $15_2$ of a base station BS2 is moving to the cell $15_1$ of the base station BS1.

Only two base stations BS are shown in the FIG. 1 for the sake of simplicity but in practice, the wireless cellular telecommunication network is composed of plural base stations BS.

The cell $15_1$ of the base station BS1 is the area in which the power strength of the signals transferred by the base station BS1, like the one transferred in the measurement channel of the base station BS1, are received by a terminal TE located in the cell $15_1$ at a level which is upper than a predetermined value.

When a full-duplex terminal TE is located in the cell $15_1$ of the base station BS1, the base station BS1 can handle the full-duplex terminal TE. The full-duplex terminal TE can establish or receive a communication with a remote telecommunication device through the base station BS1. The cell $15_1$ has not a regular shape. This is mainly due to the particular locations which are in line of sight with the base station BS1 or obstructions.

The area R1 of the base station BS1 is the area in which, for each terminal TE located in R1, the sum of the round trip delay between the base station BS1 and the terminal TE and the switch between receive and transmit modes and/or the switch between transmit and receive modes is lower than or equal to the idle period of the cell $15_1$.

In other words, when a half-duplex or full-duplex terminal TE is located in the area R1 of the base station BS1, the terminal TE can be handled by the base station BS1 and can establish or receive a communication with a remote telecommunication device through the base station BS1.

When a half-duplex terminal TE is located in the cell $15_1$ and is not located in area R1 of the base station BS1, the half-duplex terminal TE can not be handled by the base station BS1 as the terminal TE has a characteristic in the cell $15_1$ which is not compatible with the idle period of the cell $15_1$.

The area R1 is included in the cell $15_1$. The difference between R1 and $15_1$ is defined by the idle period set for the cell $15_1$.

A large idle period will enable any half-duplex terminal TE to be handled by the base station BS1 but will reduce the overall capacity in term of data transferred between the base station R1 and the half-duplex terminals TE. R1 is defined so as to provide to a majority of half duplex terminals TE located in the cell $15_1$, the possibility to be handled by the base station BS1. R1 is defined so as to avoid that the idle period has to be lengthened only for a minority of half-duplex terminals TE which are far from the base station BS1.

The cell $15_2$ of the base station BS2 is the area in which the power strength of the signals, like the one transferred in the measurement channel of the base station BS2, is received by a terminal TE located in the cell $15_2$ at a level which is upper than a predetermined value. When a full-duplex terminal TE is located in the cell $15_2$ of the base station BS2, the base station BS2 can handle the full-duplex terminal TE. The full-duplex terminal TE can establish or receive a communication with a remote telecommunication device through the base station BS2.

The area R2 of the base station BS2 is the area in which, for each terminal TE located in R2, the sum of the round trip delay between the base station BS2 and the terminal TE and the switch between receive and transmit modes and/or the switch between transmit and receive modes is lower than or equal to the idle period of the cell $15_2$.

In other words, when a half-duplex or full-duplex terminal TE is located in the area R2 of the base station BS2, the terminal TE can be handled by the base station BS2 and can establish or receive a communication with a remote telecommunication device through the base station BS2.

When a half-duplex terminal TE is located in the cell $15_2$ and is not located in area R2 of the base station BS2, the half-duplex terminal TE can not be handled by the base station BS2 as the terminal TE has a characteristic in the cell $15_2$ which is not compatible with the idle period of the cell $15_2$.

The area R2 is comprised in the cell $15_2$. The difference between R2 and $15_2$ is defined by the idle period set for the cell $15_2$.

It has to be noted here that the idle period set respectively for the cells $15_1$ and $15_2$ may be equal or different.

The base stations BS comprise means for transferring downlink signals to the terminal TE and means for receiving messages according to the present invention.

The base stations BS are also named nodes or nodes B or enhanced nodes B or access points.

The terminal TE is a half-duplex terminal like a mobile phone, a personal digital assistant, or a personal computer. The terminal TE is also named a user equipment.

The wireless telecommunication network may be cell-synchronised. In this case, the signals originated from different cells 15 or base stations BS are simultaneously transmitted.

More precisely, the signals are structured in frames, which are themselves composed of symbols. Cell synchronisation may be ensured at the symbol level meaning that the transmission time of a symbol at a given cell 15 or base station BS matches the transmission time of a symbol at any other cell 15 or base station BS. Cell synchronisation may also be ensured at the frame level. In that case, the transmission time of a frame at a given cell 15 or base station BS matches the transmission time of a frame at any other cell 15 or base station BS. Cell synchronisation can be carried out by including a GNSS (Global Navigation Satellite System) in each base station BS.

As an alternative, the wireless telecommunication network may be cell-desynchronised. In this case, no synchronisation at the frame level nor at the symbol level needs to be ensured between different cells 15 or base stations BS.

Figure 2A:
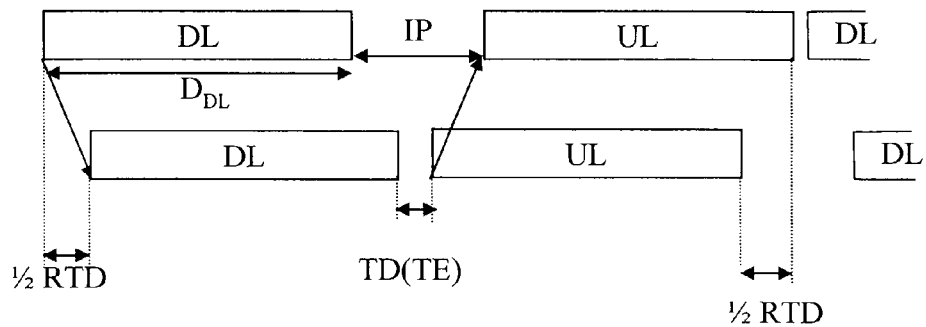
FIG. 2a is a chronogram depicting the idle period when the uplink channel is synchronous and where the base station and the half-duplex terminal don't transfer and receive signals in the idle period of the cell.

FIG. 2a is a chronogram depicting the idle period when the uplink channel is synchronous and where the base station and the half-duplex terminal don't transfer and receive signal in the idle period of the cell.

When the uplink channel is synchronous, the symbols transmitted in the uplink channel of a given cell 15 of a base station BS have to be received at the same time tr by the base station BS, regardless of the distance separating the base station BS and the terminal TE. When no signal is received or transferred during the idle period by both the base station and the half-duplex terminal side, the base station BS has to wait for the reception of the symbols transmitted by the terminal TE in order to perform the processing thereof.

The waiting time determined for the terminal TE which is located at the border of the area R1 or R2 or in other words, the largest waiting time that can be determined, is called the Guard Period or idle period IP and must be equal at least to the round trip delay RTD(Ra) plus the Receive Transmit Switch times RTS, where Ra is the radius of the area R1 or R2 if the area R1 or R2 is considered as a circle.

The base station BS1 transfers downlink symbols DL to the terminal TE. These downlink symbols DL are received by the terminal TE at a delay equal to half of the round trip delay RTD.

During the idle period IP, the base station BS doesn't transfer or receive any symbol. By not transferring or receiving any symbol, power consumption of the base station is reduced.

As the uplink symbols need to be received by the base station BS at the same time regardless of the distance separating the base station BS and each terminal TE comprised in its cell 15, the base station BS determines a timing delay TD(d) for each of the terminals TE.

The timing delay is calculated using the following formula: $TD(d)=tr-te-D_{DL}-RTD(d)=IP-RTD(d)$, where d is the distance between the terminal TE and the base station BS and $D_{DL}$ being the total duration of the symbols the terminal TE can receive in the downlink channel.

From each timing delay, the base station BS determines the Timing Advance $TA=IP-TD(d)$ for each terminal TE and transfers the Timing Advance to the corresponding terminal TE.

In case the terminal TE is scheduled in the uplink timeslot just following a preceding downlink timeslot comprising data for the terminal TE, the terminal TE applies its Timing Advance TA(TE) value for the transmission of symbols over the uplink channel in such a manner that the transmitted symbols are received at the base station BS from the terminal TE at the beginning of the uplink timeslot tr.

It has to be noted here that the idle period IP is discontinuous. The idle period IP is composed for the terminal TE1 of the two time periods noted ½ RTD and the time period TD(TE).

Figure 2B:
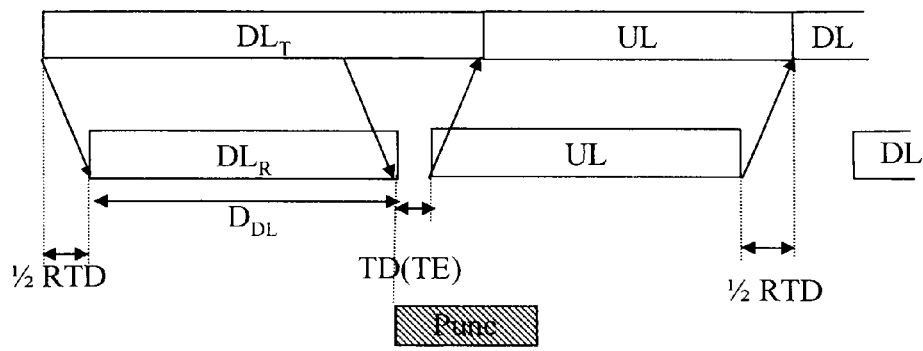
FIG. 2b is a chronogram depicting the idle period when the uplink channel is synchronous and where the half-duplex terminal does not transfer and receive signals in the idle period of the cell.

FIG. 2b is a chronogram depicting the idle period when the uplink channel is synchronous and where the half-duplex terminal does not transfer and receive signal in the idle period of the cell.

During the idle period in the example of the FIG. 2b, only the terminal TE does not receive or transfer signals.

The base station BS transfers symbols in the downlink channel $DL_T$ without any consideration of an idle period. The base station BS considers each terminal TE as being potentially a full-duplex terminal TE. The base station BS may transfer symbols even if they are not usable by the half-duplex terminals. Transferring non-usable symbols reduces development costs for manufacturing specific features of base stations which are able to handle Full and half duplex terminals TE.

When a half-duplex terminal TE, as example the terminal TE receives the symbols in the downlink channel $DL_T$, the terminal TE executes some puncturing on the received symbols. The terminal TE receives only the downlink symbols in $DL_R$ which are compatible with the idle period of the cell 15, i.e. the downlink symbols which are comprised in the duration $D_{DL}$ of the symbols the terminal can receive in the downlink channel.

The timing advance TA(TE) and the timing delay TD(TE) for the terminal TE are determined in a similar way as it has been disclosed in the FIG. 2a.

It has to be noted here that the idle period IP is continuous at the base station BS whereas it is discontinuous at the half-duplex terminal TE. It is composed for the terminal TE of the two time periods noted ½ RTD and the time period TD(TE).

Those signals Punc which are not comprised in $D_{DL}$ are not processed.

Figure 3:
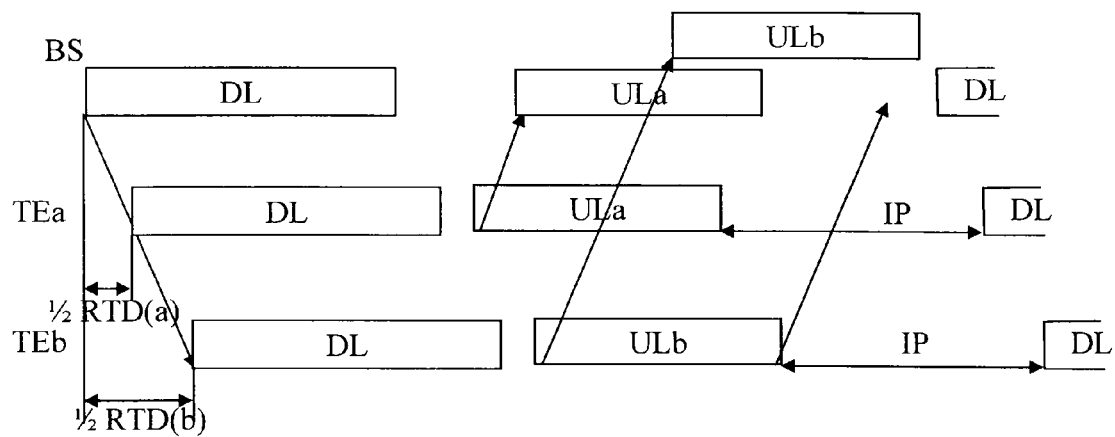
FIG. 3 is a chronogram depicting the idle period when the uplink channel is asynchronous, the wireless telecommunication network uses Time Division Duplexing scheme and the half-duplex terminal located in the cell and the base station do not transfer and do not receive signals during the idle period.

FIG. 3 is a chronogram depicting the idle period when the uplink channel is asynchronous, the wireless telecommunication network uses Time Division Duplexing scheme and the half-duplex terminal located in the cell and the base station do not transfer and do not receive signals during the idle period.

When the uplink channel is asynchronous, i.e. when the symbols transmitted in the uplink channel from different terminals TE do not have to be received at the same time, each terminal TEa or TEb transmits uplink symbols ULa or ULb over the uplink channel after a same predefined duration after the end of the reception of the signals transmitted by the base station BS in the downlink channel. The idle period is thus created at the base station BS to absorb the different propagation distance of the different terminals in the cell 15.

The terminal TEa is closer from the base station BS than the terminal TEb. The terminal TEa receives downlink symbols DL after half a round trip delay RTD(a) which is lower than half the round trip delay RTD(b) of the terminal TEb.

If the terminal TEa transfers symbols, these symbols are received by the base station BS earlier than the one transferred by the terminal TEb as it is shown in the FIG. 3.

Figure 4:
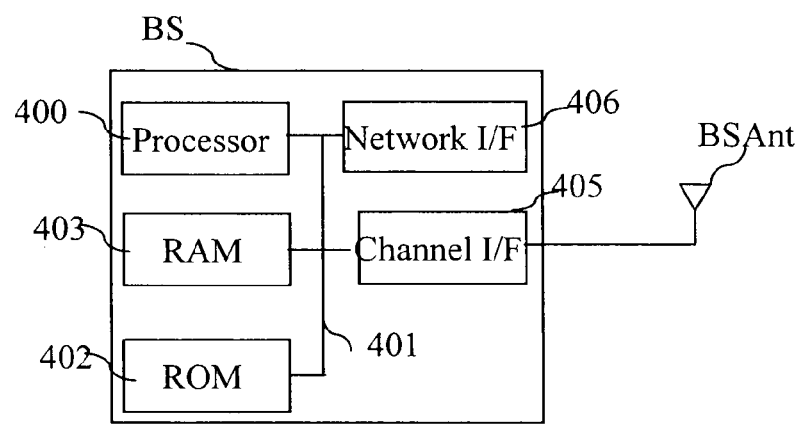
FIG. 4 is a diagram representing the architecture of a base station of the wireless telecommunication network according to the present invention.

FIG. 4 is a diagram representing the architecture of a base station according to the present invention.

Figure 7:
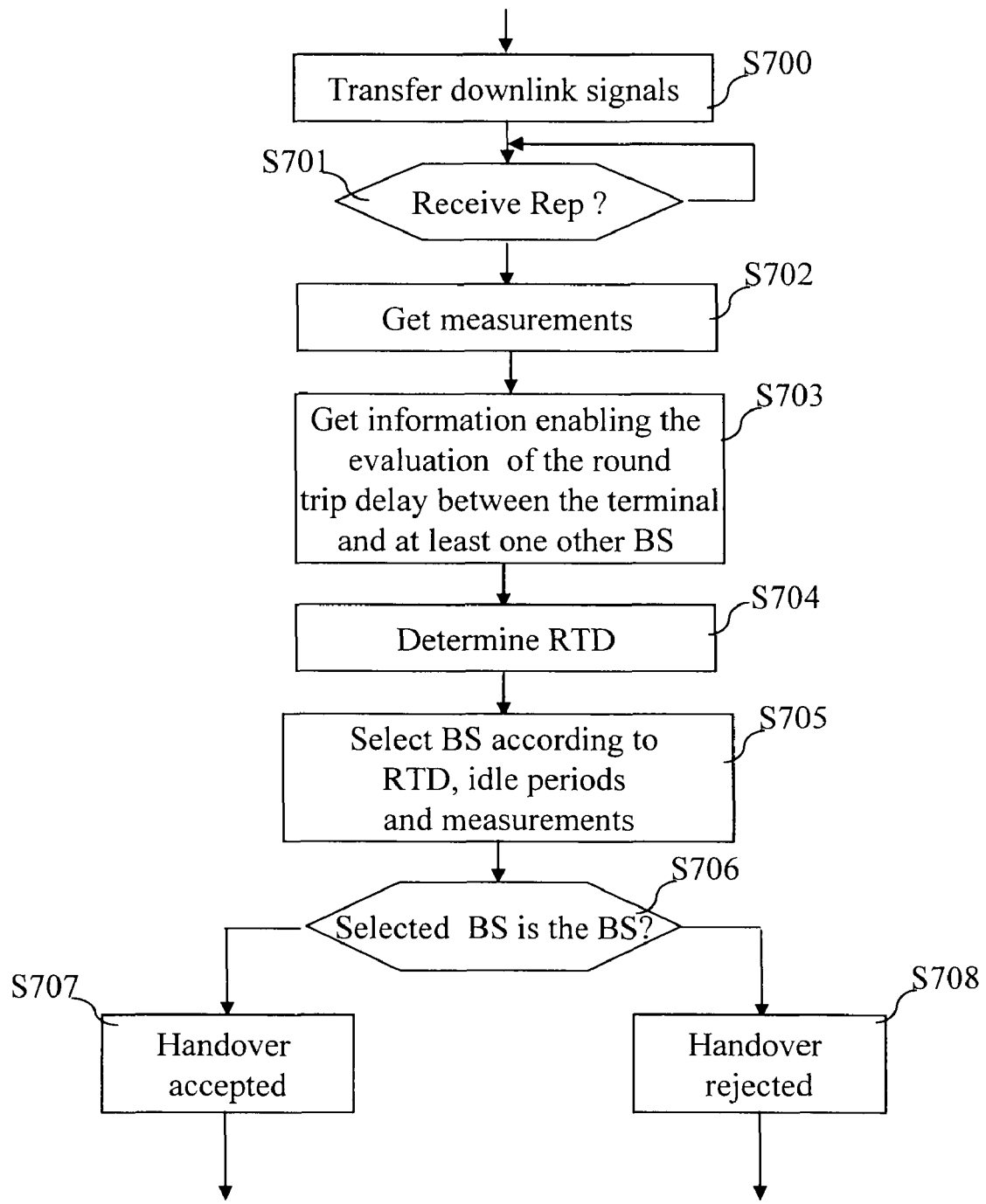
FIG. 7 is an example of algorithm executed by a base station according to the present invention.

The base stations BS, as example the base station BS1, have for example an architecture based on components connected together by a bus 401 and a processor 400 controlled by the program related to the algorithm as disclosed in the FIG. 7.

It has to be noted here that the base station BS1 is, in a variant, implemented under the form of one or several dedicated integrated circuits which execute the same operations as the one executed by the processor 400 as disclosed hereinafter.

The bus 401 links the processor 400 to a read only memory ROM 402, a random access memory RAM 403, a network interface 406 and a channel interface 405.

The read only memory ROM 402 contains instructions of the program related to the algorithm as disclosed in the FIG. 7 which are transferred, when the base station BS is powered on to the random access memory RAM 403.

The RAM memory 403 contains registers intended to receive variables, and the instructions of the program related to the algorithm as disclosed in the FIG. 7.

The channel interface 405 comprises means for transferring downlink signals to the terminal TE and means for receiving messages according to the present invention through the antenna BSAnt.

The network interface 406 comprises means for transferring and/or receiving messages to/from other base stations BS of the wireless cellular telecommunication network.

Figure 5:
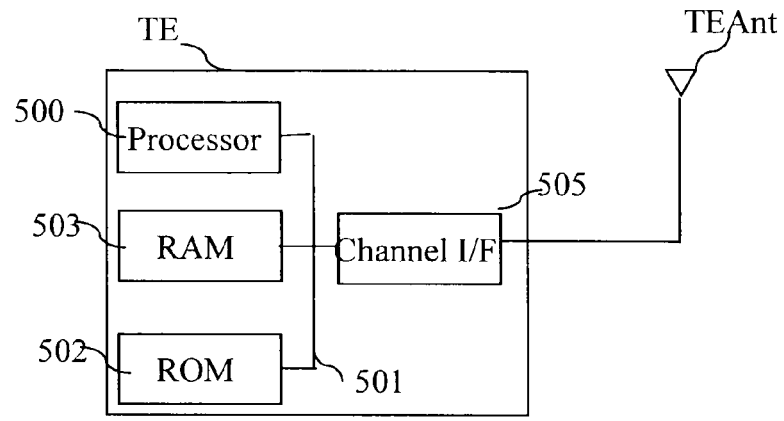
FIG. 5 is a diagram representing the architecture of a terminal of the wireless telecommunication network according to the present invention.

FIG. 5 is a diagram representing the architecture of a terminal according to the present invention.

Figure 8:
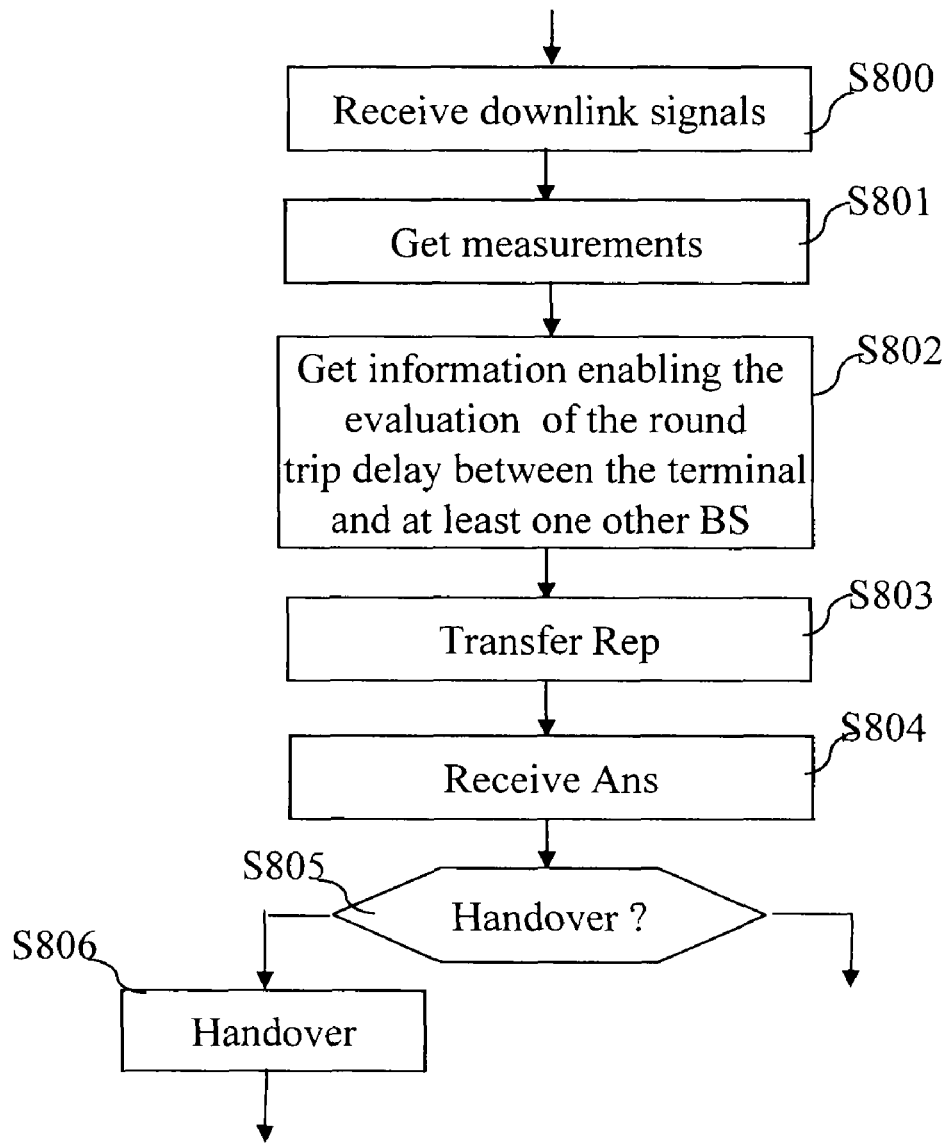
FIG. 8 is an example of algorithm executed by a terminal according to the present invention.

The terminal TE, has, for example, an architecture based on components connected together by a bus 501 and a processor 500 controlled by programs related to the algorithms as disclosed in the FIG. 8.

It has to be noted here that the terminal TE is, in a variant, implemented under the form of one or several dedicated integrated circuits which execute the same operations as the one executed by the processor 500 as disclosed hereinafter.

The bus 501 links the processor 500 to a read only memory ROM 502, a random access memory RAM 503 and a channel interface 505.

The read only memory ROM 502 contains instructions of the programs related to the algorithms as disclosed in the FIG. 8 which are transferred, when the terminal TE is powered on to the random access memory RAM 503.

The RAM memory 503 contains registers intended to receive variables, and the instructions of the programs related to the algorithms as disclosed in the FIG. 8.

The channel interface 505 comprises means for transferring and/or receiving messages to and/or from the base stations BS, means for transferring messages according to the present invention through the antenna TEAnt and means for measuring the quality of received signals.

According to the first mode of realisation of the present invention, the terminal TE comprises means for determining its location, like a Global Navigation Satellite System.

Figure 6:
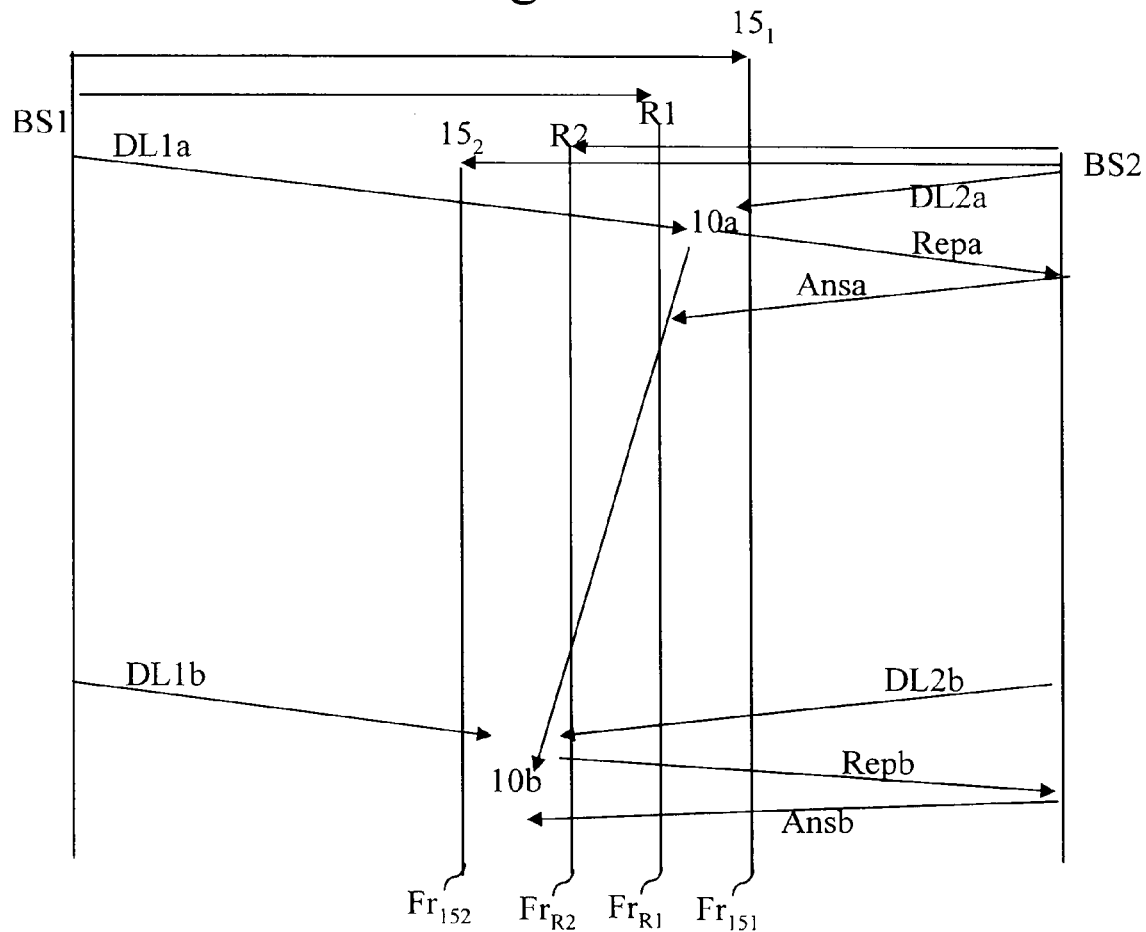
FIG. 6 depicts an example of a chronogram of signals transferred according to the present invention.

FIG. 6 depicts an example of a chronogram of signals transferred according to the present invention.

In the FIG. 6 the base stations BS1 and BS2 are respectively represented by a vertical line.

The line $Fr_{15_2}$ represents the frontier of the cell $15_2$, the line $Fr_{R2}$ represents the frontier of the area R2, the line $Fr_{R1}$ represents the frontier of the area R1 and the line $Fr_{15_1}$ represents the frontier of the cell $15_1$.

The terminal TE is moving from the location noted 10a to the location noted 10b.

The terminal TE is handled by the base station BS2.

The base stations BS transfer periodically downlink signals. When the terminal TE is located at the position 10a which is comprised in the cells $15_1$ and $15_2$, it receives downlink signals noted DL1a from the base station BS1 and downlink signals noted DL2a from the base station BS2. The downlink signal DL1 may be representative of the location of the base station BS1 and the downlink signal DL2 may be representative of the location of the base station BS2.

The terminal TE proceeds to some quality measurements on the downlink signals DL1a and DL2a.

As the terminal TE is located in the cells $15_1$ and $15_2$, the quality measurements on the downlink signals DL1a and DL2a are upper than a predetermined value.

As example, the quality measurements on the downlink signals DL1a are higher than the quality measurements on the downlink signals DL2a.

According to the first mode of realisation of the present invention, the terminal TE obtains its location from the GNSS module. According to the second mode of realisation of the present invention, the terminal TE obtains the time difference of the reception times of the signals DL1a and DL2a.

The location or the time difference are information enabling the base station BS2 which is handling the terminal TE, to evaluate the round trip delay between the terminal TE and the base station BS1.

The terminal TE transfers a message noted Repa to the base station BS2 handling the terminal TE.

According to the invention, the message Repa comprises the quality measurements or information derived from the quality measurements and information enabling the base station BS2 which is handling the terminal TE, to evaluate at least the round trip delay between the terminal TE and the base station BS1.

The base station BS2 determines, using the content of the message Repa, if a handover needs to be executed for the terminal TE with the base station BS1.

As the quality measurements on the downlink signals DL1a are higher than the quality measurements on the downlink signals DL2a, the base station BS2 should decide that a handover needs to be executed for the terminal TE with the base station BS1. According to the invention, the base station evaluates the round trip delay between the terminal TE and the base station BS1 and checks if the evaluated round trip delay is compatible with the idle period of cell $15_1$.

As the location 10a is not comprised in the area R1, the round trip delay is not compatible with the idle period of the cell $15_1$.

The base station BS2 transfers then in response, a message noted Ansa notifying the terminal TE that the base station BS2 continues to handle the terminal TE. It should be noted that the base station could alternatively transfer no explicit message to the terminal TE in order to continue to handle the terminal TE.

When the terminal TE is located at the position 10b which is comprised in the cells $15_1$ and $15_2$, it receives downlink signals noted DL1b from the base station BS1 and downlink signals noted DL2b from the base station BS2.

The downlink signal DL1a and DL1b may be representative of the location of the base station BS1 and the downlink signal DL2a and DL2b may be representative of the location of the base station BS2.

The terminal TE proceeds to some quality measurements on the downlink signals DL1b and DL2b.

As the terminal TE is located in the cells $15_1$ and $15_2$, the quality measurements on the downlink signals DL1b and DL2b are upper than a predetermined value.

As example, the quality measurements on the downlink signals DL1b are higher than the quality measurements on the downlink signals DL2b.

According to the first mode of realisation of the present invention, the terminal TE obtains its location from the GNSS module. According to the second mode of realisation of the present invention, the terminal TE obtains the time difference of the reception times of the signals DL1b and DL2b.

The location or the time difference are information enabling the base station BS2 which is handling the terminal TE, to evaluate the round trip delay between the terminal TE and the base station BS1.

The terminal TE transfers a message noted Repb to the base station BS2 handling the terminal TE.

According to the invention, the message Repb comprises the quality measurements or information derived from the quality measurements and information enabling the base station BS2 which is handling the terminal TE, to evaluate at least the round trip delay between the terminal TE and the base station BS1.

The base station BS2 determines, using the content of the message Repb, if a handover needs to be executed for the terminal TE with the base station BS1. The base station BS2 evaluates the round trip delay between the terminal TE and the base station BS1.

The location 10b is comprised in the area R1, the round trip delay is compatible with the idle period of the cell $15_1$.

As the quality measurements on the downlink signals DL1a are higher than the quality measurements on the downlink signals DL2a and the evaluated round trip delay is compatible with the idle period of the cell $15_1$, the base station BS2 transfers then in response, a message noted Ansb notifying the terminal TE that a handover procedure should be executed with the base station BS1.

FIG. 7 is an example of algorithm executed by a base station according to the present invention.

More precisely, the present algorithm is executed by the processor 400 of each base station BS periodically or in response to a predetermined event.

At step S700, the processor 400 of the base station BS, named also first base station BS, commands the channel interface 405 to transfer at least one downlink signal. The at least one downlink signal is transferred, e.g. in the measurement channel, from the base station BS.

At next step S701, the processor 400 waits for the reception of a message in response to the at least one transferred downlink signal.

At next step S702, the processor 400 gets quality measurements from the received message.

At next step S703, the processor 400 gets information enabling the evaluation of the round trip delay between the terminal TE which sent the message received at step S702 and at least one other base station BS named also second base station BS.

Preferably, at least a part of the information enabling the evaluation of the round trip delay are comprised in the message received at step S702.

According to the first mode of realisation, the information enabling the evaluation of the round trip delay between the terminal TE which sent the message received at step S702 and another base station BS is the distance separating the terminal TE and the other base station BS.

The distance separating the terminal TE and the other base station BS is comprised in the received message or is determined by the base station BS from the location of the terminal TE comprised in the received message and from the location of the other base station known by the base station BS.

The location of the other base station BS is memorised in the RAM memory of the base station BS or is received through the network interface 406 from the other base station BS or from another equipment of the wireless cellular telecommunication network.

Location information of other base stations may be explicitly communicated to the base station by means of appropriate messages transferred over the air. Alternatively, because location information of other base stations is most of the time static, it could be known in advance from base station planning information and stored in look-up-table in each base station. This would result in saving transmission time for inter base station communications.

The location of the other base station BS may be received through the network interface 406 from the other base station BS or from another equipment of the wireless cellular telecommunication network.

In a variant, the location of the mobile terminal TE or the distance separating the terminal TE and the other base station BS is not comprised in the received message. The location of the mobile terminal is determined by the base station BS using a geolocation technique as disclosed in the United States published patent application US2007/0010956 of Chabe Nerguizian and Al.

According to the second mode of realisation and when the wireless network is cell-synchronised, the information enabling the evaluation of the round trip delay between the terminal TE which sent the message received at step S702 and at least one other base station BS is the difference of time of reception of the downlink signal transferred by the base station BS and the downlink signal transferred by the other base station BS.

The difference of time of reception of the downlink signals is comprised in the received message.

It has to be noted here that, if there are plural other or second base stations, information enabling the evaluation of the round trip delay between the terminal TE and each base station BS are comprised in the received message.

At next step S704, the processor 400 determines at least one round trip delay between the terminal TE and another base station BS.

According to the first mode of realisation, the round trip delay is determined by calculating 2R/c, where R is the distance separating the terminal TE and the other base station BS and c is the speed of light.

When quality measurements and information related to plural other base stations are comprised in the message received at step S702, the processor 400 determines the round trip delay between the terminal TE and each other base station BS.

According to the second mode of realisation, the round trip delay is determined by adding to the round trip delay between the terminal TE and the base station BS, twice the difference between the time of reception of the downlink signal transferred by the base station BS and the downlink signal transferred by the other base station BS.

When quality measurements and information related to plural other base stations are comprised in the message received at step S702, the processor 400 determines the round trip delay between the terminal TE and each other base station BS.

At next step S705, the processor 400 selects the base station BS which has to handle the terminal TE according to the at least one determined round trip delay, the quality measurements and the idle period of at least one other base station BS known by the base station BS.

As example, the processor 400 selects the base station BS which has the best quality measurements and for which the round trip delay is lower than the idle period minored by the RTSs.

At next step S706, the processor 400 checks if the selected base station BS is the base station BS.

If the selected base station BS is another base station BS, the processor 400 moves to step S707. Otherwise, the processor 400 moves to step S708.

At step S707, the processor 400 commands the transfer of a message notifying the terminal TE that a handover procedure should be executed with the selected base station. After that, the processor 400 interrupts the present algorithm.

At step S708, the processor 400 commands the transfer of a message notifying the terminal TE that the base station BS continues to handle the terminal TE. It should be noted that the base station could alternatively transfer no explicit message to continue to handle the terminal TE.

After that, the processor 400 interrupts the present algorithm.

FIG. 8 is an example of algorithm executed by a terminal according to the present invention.

More precisely, the present algorithm is executed by the processor 500 of each terminal TE each time downlink signals are received, e.g. in a measurement channel, from at least one base station BS.

At step S800, the processor 500 detects the reception by the channel interface 505 of a signal, e.g. in the measurement channel, from at least one base station BS.

At next step S801, the processor 500 gets quality measurements on the signal transferred by each base station BS in its respective measurement channel.

At next step S802, the processor 500 gets information enabling the evaluation of the round trip delay between the terminal TE and at least one other base station BS, named also second base station BS, than the base station the terminal TE is handled by, named also first base station BS.

According to the first mode of realisation, the information enabling the evaluation of the round trip delay between the terminal TE and the base station BS is the location of the terminal TE obtained from a GNSS module comprised in the terminal TE or is the distance separating the terminal TE and the other base station BS obtained from the GNSS module and the location of the other base station BS broadcasted by the other base station BS.

According to the second mode of realisation and when the wireless network is cell-synchronised, the information enabling the evaluation of the round trip delay between the terminal TE and the at least one other base station BS is the difference of the time of reception of the downlink signal transferred by the base station BS which handles the terminal TE and of the time of reception of the downlink signal transferred by the other base station BS.

At next step S803, the processor 500 commands the transfer of a Rep message to the base station BS which handles the terminal TE.

The Rep message comprises quality measurements and the information enabling the evaluation of the round trip delay between the terminal TE and the at least one other base station BS.

It has to be noted here that, if there are plural other base stations BS, information enabling the evaluation of the round trip delay between the terminal TE and each base station BS are comprised in the Rep message.

At next step S804 the processor 500 detects the reception by the channel interface 505 of at least one message Ans.

At next step S805, the processor 500 checks if the received message is a message notifying the terminal TE that a handover procedure should be executed with one other base station BS.

If the received message is a message notifying the terminal TE that a handover procedure should be executed with one other base station BS, the processor 500 moves to step S806. Otherwise, the processor 500 interrupts the present algorithm.

At step S806, the processor 500 starts a classical handover procedure with the other base station.

Naturally, many modifications can be made to the embodiments of the invention described above without departing from the scope of the present invention.

The invention claimed is:

1. A method for determining, in a wireless cellular telecommunication network, if a handover of a half-duplex terminal has to be executed from a first base station to a second base station, each base station transferring signals in a respective cell, the half-duplex terminal, when being handled by one of the base stations, not transferring and not receiving signals during an idle period of the cell of the base station which handles the half-duplex terminal, the method comprising steps, executed by the first base station, of:
   transferring, to the half-duplex terminal, a downlink signal in the cell of the first base station;
   receiving a message transferred by the half-duplex terminal in response to the downlink signal transferred by the first base station, the message including information indicating quality measurements on the downlink signal transferred by the first base station and at least quality measurements on a downlink signal transferred by the second base station;
   obtaining information enabling the determination of a round trip delay between the half-duplex terminal and the second base station;
   determining the round trip delay between the half-duplex terminal and the second base station; and
   transmitting a handover notification message to the half-duplex terminal instructing the half-duplex terminal to execute a handover procedure from the first base station to the second base station upon determination that the quality measurements of the second base station are higher than the first base station and that the round trip delay between the half-duplex terminal and the second base station is less than the idle period of the second base station.

2. The method according to claim 1, wherein
the wireless telecommunication network uses a half duplex Frequency Division Duplexing scheme,
and only half-duplex terminals handled by the first or second base station do not transfer and do not receive signals during the idle period of the cell of the first or second base station or the half-duplex terminals handled by the first or second base station and the first or second base station do not transfer and do not receive signals during the idle period of the cell of the first or second base station.

3. The method according to claim 1, wherein the wireless telecommunication network uses a Time Division Duplexing scheme,
and the half-duplex terminals handled by the first or second base station and the first or second base station do not transfer and do not receive signals during the idle period.

4. The method according to claim 2 or 3, wherein the information enabling the determination of the round trip delay between the half-duplex terminal and the second base station is the location of the half-duplex terminal and the location of the second base station.

5. The method according to claim 4, wherein the location of the half-duplex terminal is included in the received message.

6. The method according to claim 4, wherein the location of the second base station is included in a message transferred by the second base station to the first base station or included in the received message.

7. The method according to claim 2 or 3, wherein
the cells of the wireless cellular telecommunication network are synchronised,
and the information enabling the determination of the round trip delay between the half-duplex terminal and the second base station is the difference of the time of reception by the half-duplex terminal of the signal transferred by the first base station and the signal transferred by the second base station.

8. A method for enabling the determination, in a wireless cellular telecommunication network, if a handover of a half-duplex terminal has to be executed from a first base station to a second base station, each base station transferring signals in a respective cell, the half-duplex terminal, when being handled by one of the base stations, not transferring and not receiving signals during an idle period of the cell of the base station which handles the terminal, the method comprising steps, executed by the half-duplex terminal, of:
receiving downlink signals from the first base station and the second base station;
transferring a message to the first base station, the message including information indicating quality measurements on the downlink signal transferred by the first base station and at least quality measurements on the downlink signal transferred by the second base station and information enabling the determination of a round trip delay between the half-duplex terminal and the second base station; and
receiving a handover notification message instructing the half-duplex terminal to execute a handover procedure from the first base station to the second base station, the handover notification message transmitted by the first base station upon determination that the quality measurements of the second base station are higher than the first base station and that the round trip delay between the half-duplex terminal and the second base station is less than the idle period of the second base station.

9. The method according to claim 8, wherein the wireless telecommunication network uses a half duplex Frequency Division Duplexing scheme,
and only half-duplex terminals handled by the first or second base station do not transfer and do not receive signals during the idle period of the cell of the first or second base station or the half-duplex terminals handled by the first or second base station and the first or second base station do not transfer and do not receive signals during the idle period of the cell of the first or second base station.

10. The method according to claim 8, wherein the wireless telecommunication network uses a Time Division Duplexing scheme,
and the half-duplex terminals handled by the first or second base station and the first or second base station do not transfer and do not receive signals during the idle period.

11. The method according to claim 9 or 10, wherein the information enabling the determination of the round trip delay between the half-duplex terminal and the second base station is the location of the half-duplex terminal.

12. The method according to claim 11, further comprising a step of:
receiving, from the second base station, the location of the second base station, wherein
the location of the second base station is included in the message transferred to the first base station.

13. The method according to claim 9 or 10, wherein
the cells of the wireless cellular telecommunication network are synchronised,
and the information enabling the determination of the round trip delay between the half-duplex terminal and the second base station is the difference of the time of reception by the half-duplex terminal of the signal transferred by the first base station and the signal transferred by the second base station.

14. A device for determining, in a wireless cellular telecommunication network, if a handover of a half-duplex terminal has to be executed from a first base station to a second base station, each base station transferring signals in a respective cell, the half-duplex terminal, when being handled by one of the base stations, not transferring and not receiving signals during an idle period of the cell of the base station which handles the terminal, the device included in the first base station, the device comprising:
means for transferring, to the half-duplex terminal, a downlink signal in the cell of the first base station;
means for receiving a message transferred by the half-duplex terminal in response to the downlink signal transferred by the first base station, the message including information indicating quality measurements on the downlink signal transferred by the first base station and at least quality measurements on a downlink signal transferred by the second base station and information enabling determination of a round trip delay between the half-duplex terminal and the second base station;
means for determining the round trip delay between the half-duplex terminal and the second base station;
means for transmitting a handover notification message to the half-duplex terminal instructing the half-duplex terminal to execute a handover procedure from the first base station to the second base station upon determination that the quality measurements of the second base station are higher than the first base station and that the round trip delay between the half-duplex terminal and the second base station is less than the idle period of the second base station.

15. A device for enabling the determination, in a wireless cellular telecommunication network, if a handover of a half-duplex terminal has to be executed from a first base station to a second base station, each base station transferring signals in a respective cell, the half-duplex terminal, when being handled by one of the base stations, not transferring and not receiving signals during an idle period of the cell of the base station which handles the terminal, the device included in the half-duplex terminal, the device comprising:
- means for receiving downlink signals from the first base station and the second base station,
- means for transferring a message to the first base station, the message including information indicating quality measurements on the downlink signal transferred by the first base station and at least quality measurements on the downlink signal transferred by the second base station and information enabling the determination of a round trip delay between the half-duplex terminal and the second base station; and
- means for receiving a handover notification message instructing the half-duplex terminal to execute a handover procedure from the first base station to the second base station, the notification transmitted by the first base station upon determination that the quality measurements of the second base station are higher than the first base station and that the round trip delay between the half-duplex terminal and the second base station is less than the idle period of the second base station.

16. A non-transitory computer readable medium having computer executable instructions stored therein, which when executed by a processor in a programmable device causes the processor to execute a method according to anyone of claims 1 to 3.

17. A non-transitory computer readable medium having a computer executable instructions stored therein, which when executed by a processor in a programmable device causes the processor to execute a method according to anyone of claims 8 to 10.

* * * * *